C. BURNS.
JAM NUT.
APPLICATION FILED JUNE 1, 1909.
952,507.  Patented Mar. 22, 1910.
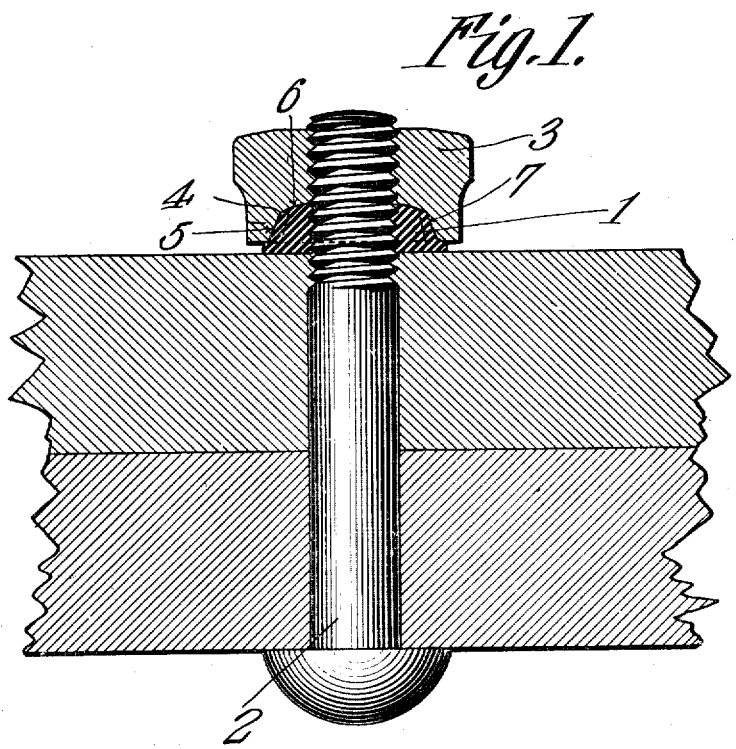
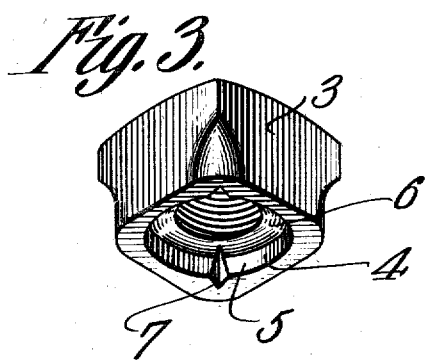
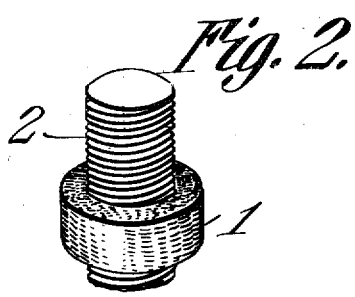
Inventor
Cornelius Burns.

UNITED STATES PATENT OFFICE.

CORNELIUS BURNS, OF BURNSIDE, PENNSYLVANIA.

JAM-NUT.

952,507.  Specification of Letters Patent.  Patented Mar. 22, 1910.

Application filed June 1, 1909. Serial No. 499,361.

*To all whom it may concern:*

Be it known that I, CORNELIUS BURNS, a citizen of the United States, residing at Burnside, in the county of Clearfield and State of Pennsylvania, have invented a new and useful Jam-Nut, of which the following is a specification.

This invention has relation to jam nuts and it consists in the novel construction and arrangements of its parts, as hereinafter shown and described.

The object of the invention is to provide a simple and an effective means for jamming a nut in position upon the thread of a bolt; and, with this object in view, the device consists in providing a flexible annulus, which is adapted to snugly receive the bolt, and in providing in the under face of the nut a recess adapted to receive one end portion of the said annulus. The recess in the inner face of the nut is provided with an annular side-wall which converges toward the center of the nut. The said recess is also provided with a bottom wall, which is slightly concaved, or substantially so. The side wall of the recess is provided, at suitable intervals, with notches or indentations. The sides and bottom of the said recess are so positioned that when the flexible annulus is subjected to pressure, it will be forced in and securely seated in engagement with the thread of the bolt, and at the same time the outer portion of the said annulus will be forced into the notches in the side-wall of the recess of the nut; thereby affording a locking means, and, inasmuch as the annulus is composed of flexible material, such as rubber, it will protect the thread of both the nut and the bolt from rust and the elements of weather.

Figure 1 is a side elevation of a bolt with the jam nut device shown in section. Fig. 2 is a perspective view of the end of the bolt and an annulus fused in the jam nut device located thereon, and Fig. 3 is a perspective view of a nut used in the device.

The elements composing the component parts of the jam nut mechanism include a flexible washer or annulus, 1, which is adapted to snugly fit over the threaded portion of a bolt, 2. The said annulus may be made of rubber, or any other suitable flexible material. The nut 3, is provided in its inner or under face with a concentric recess, 4. The recess 4, is provided with a side-wall 5, which is annular, and which converges toward the center of the nut. The said recess 4, is also provided with a bottom wall 6, which is slightly concaved or substantially so. The side-wall 5, of the recess 4, is provided with the indentations 7.

The parts of the jam-nut device are applied and assembled as follows:—The bolt 2, is first passed through the bolt perforation in a support or object. The annulus 1, is then slipped on the threaded portion of the bolt 2. The nut 3, is then screwed upon the threaded portion of the bolt 2, and as the said nut moves along the thread of the said bolt, toward the head of the bolt, the recess 4, eventually receives the end of the annulus 1. The inclined side wall 5, of the recess 4, will compress that portion of the said annulus which enters the recess, and will force the same laterally into the thread of the bolt 2, and the indentations 7, in the said side-wall 5, of the recess 4. When, however, the bottom wall 6, of the recess 4, comes in contact with the end of the annulus 1, the said annulus may be moved longitudinally along the bolt 1, until its inner end comes in contact with the support or object through which the said bolt passes. When this occurs, and as the said nut, 3, continues to move longitudinally along the bolt 2, the annulus 1, is compressed longitudinally, and by reason of the fact that the bottom wall 6, is dished, or slightly concaved, the extreme end portion of the annulus 1, which lies within the recess 4, will be shunted or directed in a precipitous manner toward the thread of the bolt 2, and, eventually, will be firmly seated in the said thread and portions of the said annulus will be forced into the thread of the nut 3. Thus it will be seen that the annulus 1, is compressed both laterally and longitudinally, and the effect of both processes of compression is to firmly seat the material of which the annulus is composed in the thread of the bolt. This has the effect of providing a simple and effectual jam nut mechanism, and also by reason of the fact that the said annulus is forced into such close contact with the thread of both the bolt and nut, the threads of the said parts will be protected from moisture and the weather. The inner surface portions of the annulus 1, which engage the thread of the bolt 2, serve to form a positive connection between the said annulus and the bolt, while the outer portions of the said annulus which enter the indentations 7, provided in the wall 5, of the recess 4, serve as a positive connection between the said annulus and the nut. Therefore the nut and the bolt become locked in their relative positions with relation to each other, while the annulus is compressed to the fullest extent, as above described.

Having described my invention, what I claim as new, and desire to secure by Letters Patent is:—

In a combination with a threaded bolt a jam nut device comprising an annulus of flexible material snugly fitted upon the threaded portion of the bolt, a nut having a threaded bolt perforation adapted to engage the thread of the bolt, said nut being provided upon its inner face with a concentric recess, said recess having an annular side wall which converges toward the center of the nut, said recess also having within said annular side wall a substantially concaved bottom wall, said side wall having indentations the inner ends of which project into the concaved bottom wall but terminate short of the threaded bolt perforation, said recess being adapted to receive the end portion of the annulus and the walls thereof being adapted to direct the end portions of the annulus at different angles toward the thread of the bolt.

In testimony that I claim the foregoing as my own, I have hereto affixed my signature in the presence of two witnesses.

CORNELIUS BURNS.

Witnesses:
W. H. McONNKING,
J. C. WEITZEL.